United States Patent
Imai et al.

(10) Patent No.: US 10,986,703 B2
(45) Date of Patent: Apr. 20, 2021

(54) HEATING COOKER

(71) Applicant: Panasonic Intellectual Property Management Co., Ltd., Osaka (JP)

(72) Inventors: Hirohisa Imai, Shiga (JP); Gantetsu Matsui, Kyoto (JP); Naoya Taniguchi, Kyoto (JP); Mariko Takenouchi, Osaka (JP); Saki Takakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 135 days.

(21) Appl. No.: 16/095,808

(22) PCT Filed: Jun. 23, 2017

(86) PCT No.: PCT/JP2017/023118
§ 371 (c)(1),
(2) Date: Oct. 23, 2018

(87) PCT Pub. No.: WO2018/012245
PCT Pub. Date: Jan. 18, 2018

(65) Prior Publication Data
US 2019/0141797 A1   May 9, 2019

(30) Foreign Application Priority Data
Jul. 11, 2016   (JP) .............................. JP2016-136485

(51) Int. Cl.
*H05B 6/64*   (2006.01)
*H05B 6/68*   (2006.01)
(Continued)

(52) U.S. Cl.
CPC ............. *H05B 6/6447* (2013.01); *F24C 7/02* (2013.01); *F24C 15/00* (2013.01); *G06K 7/1413* (2013.01);
(Continued)

(58) Field of Classification Search
CPC . F24C 7/085; F24C 15/00; F24C 7/02; H05B 6/6441; H05B 6/687; H05B 6/6447;
(Continued)

(56) References Cited

U.S. PATENT DOCUMENTS

| 2007/0007279 A1* | 1/2007 | Chun | .................. | H05B 6/6441 |
|---|---|---|---|---|
| | | | | 219/506 |
| 2014/0203012 A1* | 7/2014 | Corona | .................. | H05B 6/687 |
| | | | | 219/705 |

(Continued)

FOREIGN PATENT DOCUMENTS

| JP | 7-022310 U | 4/1995 |
|---|---|---|
| JP | 8-236268 A | 9/1996 |

(Continued)

OTHER PUBLICATIONS

International Search Report of PCT application No. PCT/JP2017/023118 dated Sep. 26, 2017.

(Continued)

*Primary Examiner* — Quang T Van
(74) *Attorney, Agent, or Firm* — McDermott Will and Emery LLP

(57) ABSTRACT

Heating control information recognizing unit recognizes heating control information of an object to be heated from an image of the inside of heating chamber captured by imaging unit, and heating controller controls heating unit based on the heating control information. When it is difficult for heating control information recognizing unit to perform recognition, disposing position guide unit guides the object to be heated to a capturing range of imaging unit. It is thus possible to recognize the heating control information with a simple configuration including a single camera functioning as imaging unit.

6 Claims, 9 Drawing Sheets

(51) Int. Cl.
   *H05B 1/02*     (2006.01)
   *F24C 15/00*    (2006.01)
   *F24C 7/02*     (2006.01)
   *G06K 7/14*     (2006.01)
   *G06K 9/62*     (2006.01)

(52) U.S. Cl.
   CPC ......... *G06K 9/6212* (2013.01); *H05B 6/6414* (2013.01); *H05B 6/687* (2013.01)

(58) Field of Classification Search
   CPC ... H05B 6/6414; G06K 9/6212; G06K 7/1413
   USPC ....... 219/702, 704, 705, 506, 710, 708, 719, 219/720, 756, 497, 716
   See application file for complete search history.

(56)             References Cited

U.S. PATENT DOCUMENTS

2015/0213009 A1    7/2015  Nonaka et al.
2017/0006669 A1    1/2017  Kamei et al.
2019/0098708 A1    3/2019  Nakajima et al.

FOREIGN PATENT DOCUMENTS

JP      2001-349546      12/2001
JP      2006-145142       6/2006
JP      2008-287904 A    11/2008

OTHER PUBLICATIONS

The Extended European Search Report dated Feb. 27, 2020 for the related European Patent Application No. 17827375.1.

\* cited by examiner

HEATING COOKER

This application is a U.S. national stage application of the PCT International Application No. PCT/JP2017/023118 filed on Jun. 23, 2017, which claims the benefit of foreign priority of Japanese patent application No. 2016-136485 filed on Jul. 11, 2016, the contents all of which are incorporated herein by reference.

TECHNICAL FIELD

The present invention relates to a heating cooker for heating food.

BACKGROUND ART

A microwave oven, which is a typical heating cooker, is convenient in that it can heat food placed in a container without using a pot or a frying pan. Clerks at stores selling box lunches and side dishes or other food in containers may offer a service of heating purchased food in a microwave oven to provide heated food.

Such a heating service will be described below. The containers of box lunches and side dishes usually have an indication of an optimum heating time for heating such food in a microwave oven. A store clerk checks the indication and sets the heating time in a microwave oven before heating the food. The microwave oven has an operation unit including numeric keys, for example, allowing manual setting of the heating time (minute (min.), second (sec.)).

In some cases, the microwave oven has a plurality of operation buttons, to which different heating times are allocated. In those cases, the store clerk selects a button corresponding to the food to be heated, thereby heating the food or the like under heating control suitable for that food, to provide heated food to a customer.

As in the former configuration, when a user sets a heating time (min., sec.) using numeric keys, the user may find the setting cumbersome because of a number of operations required. In the latter configuration, that is, when different heating times are allocated to respective operation buttons, the user may not be able to remember the correspondences between the buttons and the heating times as food types increase.

In order to eliminate such cumbersome operations and mistakes, there has been proposed a method in which a microwave oven stores in advance the heating control content for each product, a store clerk reads barcode information (code information) attached to a product using a barcode reader, and the microwave oven reads the heating control content corresponding to the product from the code information for the purpose of properly heating the product.

In addition to the method of using a barcode reader, there has been also proposed a method in which a microwave oven includes a camera that captures an image of the inside of a heating chamber of the microwave oven, a bar code portion is extracted from an image of a product put into the heating chamber, the bar code is read, the heating control content corresponding to the product is read from code information, and proper heating is performed (see PTL 1, for example).

If heating control information is directly attached to the product as the code information instead of reading the heating control information corresponding to the product from the code information, it is not necessary for the microwave oven to store in advance the heating control information for each product.

These methods reduce clerks' operational load to enable an error-free heating service.

CITATION LIST

Patent Literature

PTL 1: Unexamined Japanese Patent Publication No. 2001-349546

SUMMARY OF THE INVENTION

In order to read code information from an image of the inside of a chamber of a microwave oven, which is captured by a camera disposed in the chamber, the camera must be an extremely fine camera. That is, in order to distinguish white portions from black portions on barcodes, the camera must have such high resolution that enables allocation of some pixels to black lines and white spaces. Without such resolution, the camera cannot read information. This is applicable to barcodes and code information including characters, figures, and other symbols.

There has been proposed a method in which a plurality of cameras capture respectively images of divided areas in a chamber of a microwave oven and code information in an image captured by any of the cameras is read. However, this method requires a complicated system. In addition, if a plurality of images include the code information, it is difficult to read the code information.

The present invention recognizes heating control information and automatically sets the heating control content with a simple configuration including a single camera.

A heating cooker according to the present invention includes a heating chamber that houses an object to be heated, a heating unit that heats the object to be heated disposed in the heating chamber, an imaging unit that captures an image of an inside of the heating chamber, and a heating control information recognizing unit that recognizes heating control information of the object to be heated from the image captured by the imaging unit. The present invention also includes a heating controller that controls the heating unit based on the heating control information recognized by the heating control information recognizing unit and a disposing position guide unit that guides a disposing position of the object to be heated to a capturing range of the imaging unit.

According to the present invention, when it is difficult for the heating control information recognizing unit to perform recognition in a state where an object to be heated, which is a heating target such as a box lunch or a side dish, is put into a heating chamber, the disposing position guide unit guides the object to be heated to the capturing range of the imaging unit. It is thus possible to recognize the heating control information with a simple configuration including a single camera.

DESCRIPTION OF EMBODIMENTS

First Exemplary Embodiment

Figure 1:
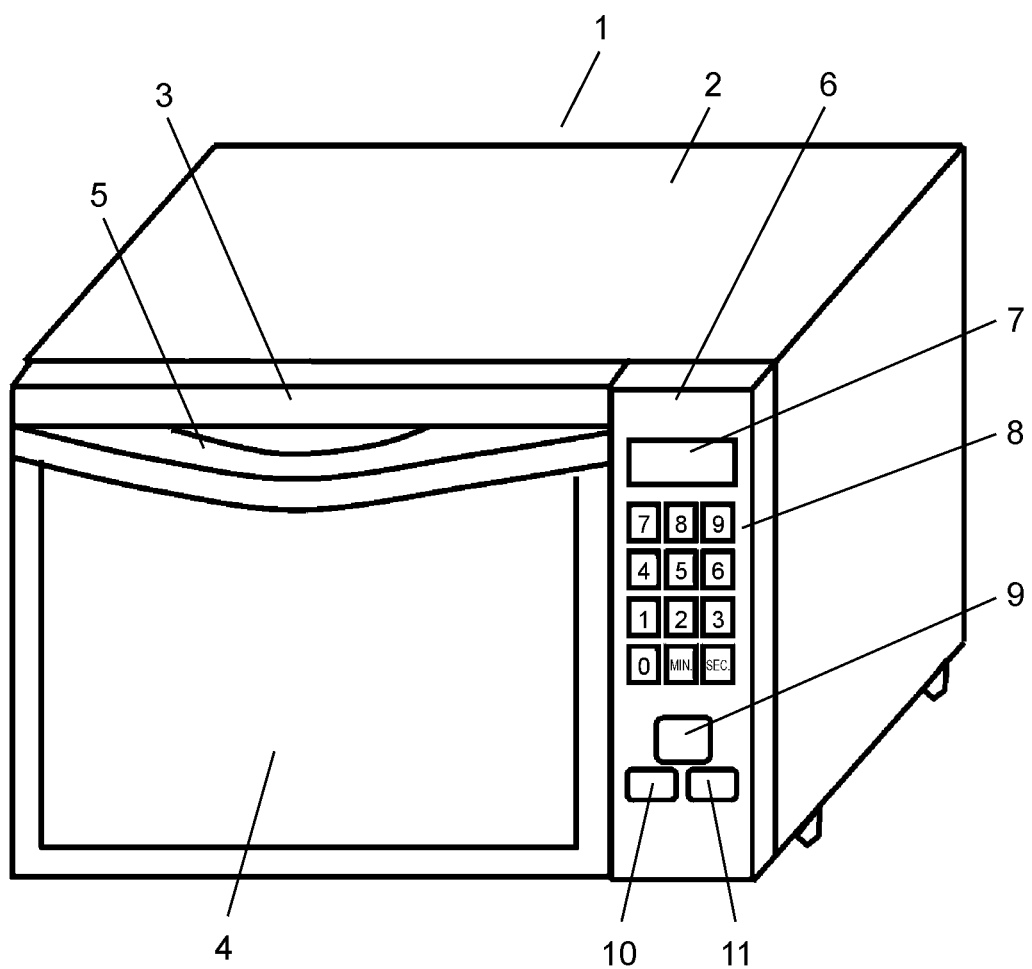
FIG. 1 is a perspective view illustrating an appearance of a heating cooker according to a first exemplary embodiment of the present invention.

FIG. 1 is a perspective view illustrating an appearance of a microwave oven that is an example of a heating cooker according to a first exemplary embodiment of the present invention. As illustrated in FIG. 1, microwave oven 1 has door 3 that allows food to be put into and taken out from housing 2 for storing food. Door 3 has transparent glass window 4 that allows a user to see the inside of housing 2 from outside, handle 5 grasped by the user to open or close door 3, and operation display unit 6.

Operation display unit 6 includes liquid crystal display 7, time-setting button group 8, heating start button 9, cancel button 10, and pause button 11. As described later, microwave oven 1 captures an image of food, which is a heating target (object to be heated), with an imaging unit, reads a heating time indicated on the food, and heats the food for the heating time.

A heating time read and characters of a notice to a user are displayed on liquid crystal display 7. A direction of the guiding determined by guide direction determination unit 33 to be described later (see FIG. 2) is also displayed on liquid crystal display 7.

Microwave oven 1 has time-setting button group 8 for use when microwave oven 1 fails to read a heating time or when food has no indication of a heating time. A user can set a heating time by using numeric buttons and "min." and "sec." buttons. In this case, liquid crystal display 7 displays the set heating time.

Heating start button 9 is a button pressed by a user to start heating after the user checks the heating time displayed on liquid crystal display 7. Cancel button 10 is a button pressed after a user has pressed heating start button 9 and started heating, to stop the heating being performed, or to cancel the setting of the heating time being displayed on liquid crystal display 7. Pause button 11 is a button pressed by a user to temporarily stop the heating being performed. The user who has paused the heating can resume the heating at the point of pause by pressing heating start button 9 again.

Figure 2:
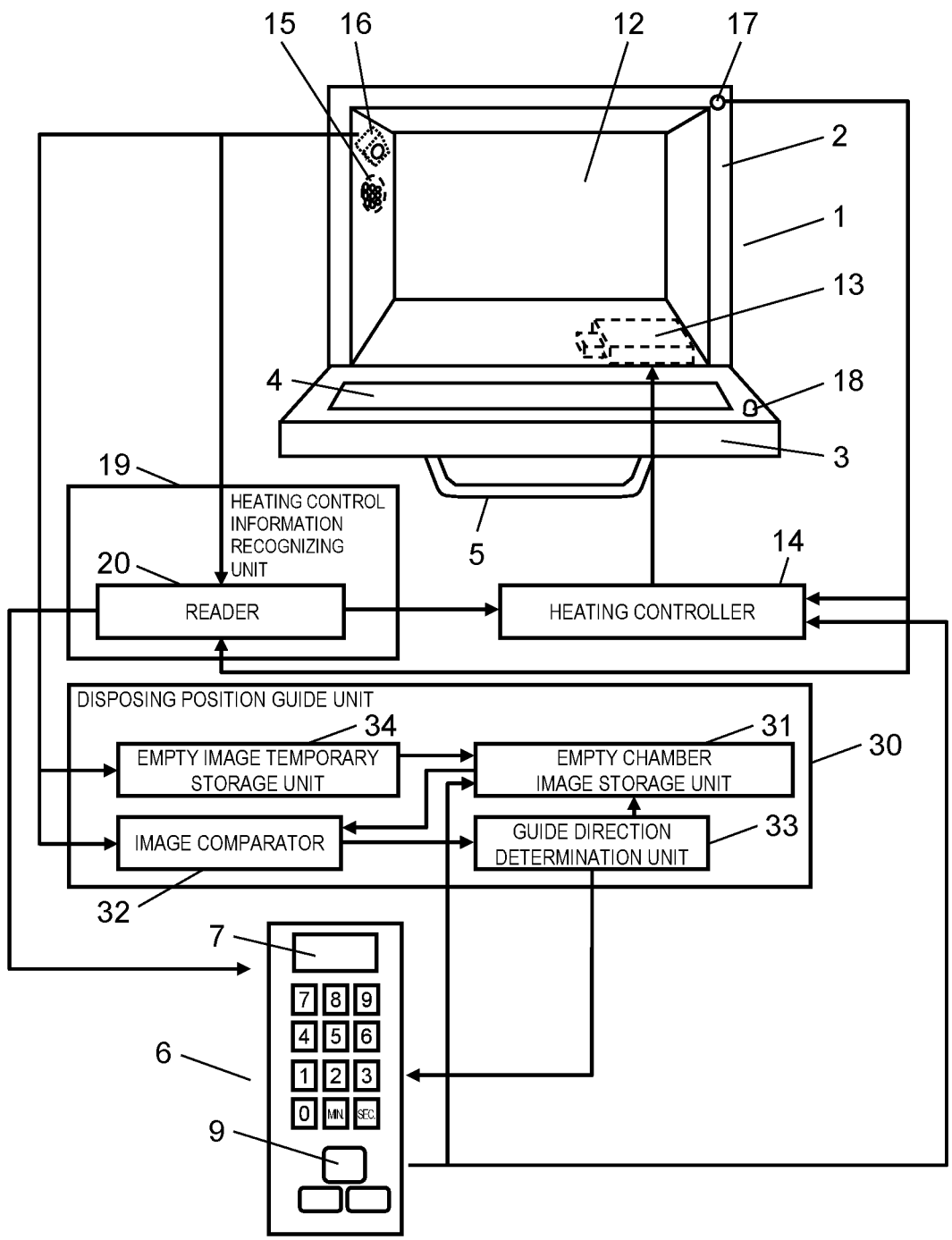
FIG. 2 is a schematic configuration diagram of the heating cooker according to the first exemplary embodiment of the present invention.

FIG. 2 is a schematic configuration diagram of microwave oven 1 according to the present exemplary embodiment. Microwave oven 1 is capable of high-frequency heating of food and the like. Microwave oven 1 includes magnetron 13 functioning as a heating unit that outputs high frequency in heating chamber 12 that houses an object to be heated such as food. Magnetron 13 supplies high frequency to heating chamber 12 for the purpose of heating food. Magnetron 13 is controlled by heating controller 14.

Microwave oven 1 also includes lamp 15 and camera 16 functioning as an imaging unit on the same side where lamp 15 is provided. Camera 16 captures an image of the inside of heating chamber 12. Since camera 16 is disposed on the same side as lamp 15, camera 16 can capture an image of the inside of heating chamber 12 without backlight.

Housing 2 has door switch 17 for detecting an open state and a closed state of door 3. Door 3 has projection 18 to push door switch 17.

Examples of food (objects to be heated) put into heating chamber 12 include a box lunch, a rice ball, and a side dish. A label (see FIG. 3) is attached to the respective food. The label indicates heating power and a heating time as heating control information of food. Heating control information recognizing unit 19 includes reader 20. Reader 20 extracts a portion of a label attached to a product that indicates the heating control information from an image captured by camera 16 and reads characters (including at least figures) of the heating control information.

Figure 3:
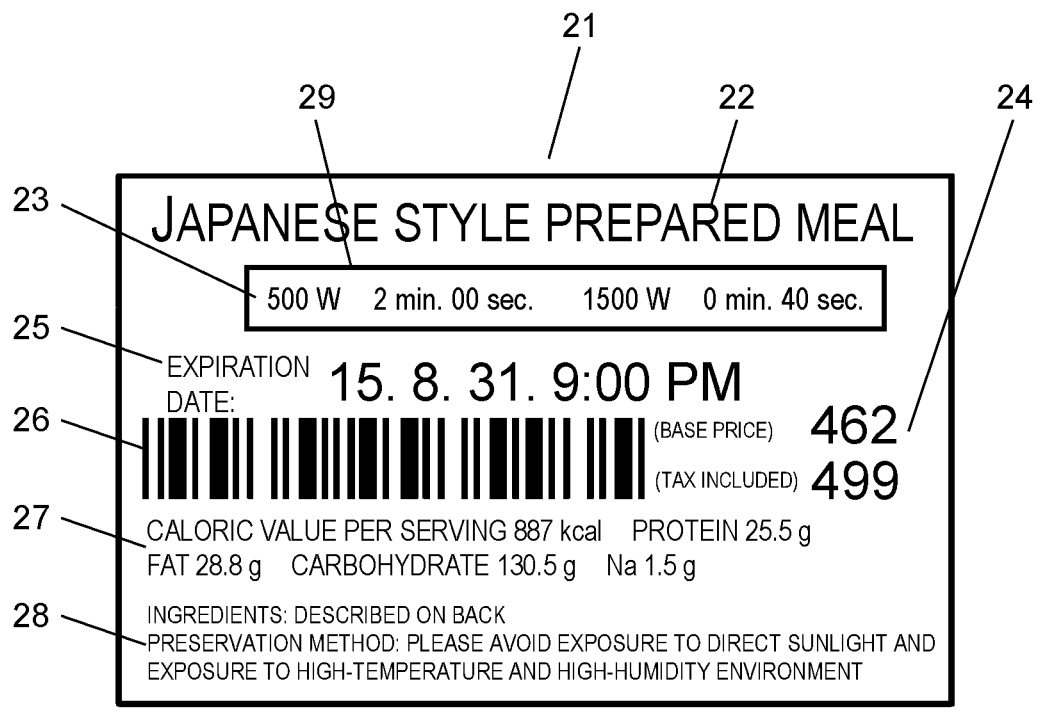
FIG. 3 is an explanatory diagram of product information including heating control information indicated on an object to be heated by the heating cooker according to the first exemplary embodiment of the present invention.

FIG. 3 illustrates an example of label 21 attached to food. Label 21 indicates various information such as product name 22, heating control information 23, price information 24, expiration date information 25, barcode 26, which is an example of a code symbol for identifying food, nutrition information 27, and notice information 28. On label 21, mark frame 29, which is a rectangular location-specifying mark formed to surround heating control information 23, is indicated for easy extraction of heating control information 23 from the various information.

Heating control information 23 on label 21 includes two pieces of heating control information. Specifically, heating control information 23 on label 21 indicates two heating times for reference. One is a heating time for heating with a heating power of 500 W, for example, as a reference for heating in a typical household microwave oven. The other is a heating time for heating with a heating power of 1500 W, for example, as a reference for heating in a commercial-use microwave oven with a high heating power for a short time. For example, "500 W 2 min. 00 sec. 1500 W 0 min. 40 sec" is indicated.

More specifically, heating control information 23 includes first to sixth character strings in this order. The first character string is a figure indicating a heating amount with a predetermined heating power, for example, "500". The second character string indicates a unit of the heating power, for example, "W". The third character string is a figure indicating a heating time with the heating power, for example, "2". The fourth character string indicates a unit of the heating time, for example, "min.". The fifth character string is a figure indicating the heating time with the heating power, for example, "00". The sixth character string indicates the unit of the heating time, for example, "sec.". In addition, heating control information 23 includes seventh to twelfth character strings in this order. The seventh character string is a figure indicating a heating amount with a heating power larger than the predetermined heating power, for example, "1500". The eighth character string indicates the unit of the heating power, for example, "W". The ninth character string is a figure indicating the heating time with the heating power, for example, "0". The tenth character string indicates the unit of the heating time, for example, "min.". The eleventh character string is a figure indicating the heating time with the heating power, for example, "40". The twelfth character string indicates the unit of the heating time, for example, "sec.".

In the present exemplary embodiment, "watt (W)", which is the unit of heat amount specified by the International System of Units (SI), is used as the second character string and the eighth character string. However, any other characters or units may be used as long as the characters or units indicate the unit of heating power. Additionally, "min" or "sec.", which is characters indicating the unit of time, is used as the fourth character string, the sixth character string, the tenth character string, and the twelfth character string. However, any other characters or units may be used as long as the characters or units indicate the unit of time.

Reader 20 first extracts mark frame 29 from an image captured by camera 16. Reader 20 then reads the alphanumeric characters surrounded by mark frame 29 as a character string of "500W2001500W040". Reader 20 does not read the characters that indicate the time units such as "min." and "sec.", or does not use these characters for analysis even if reader 20 reads the characters.

Reader 20 then divides the character string into four numeric strings according to a predetermined analysis rule. The four numeric strings include a numeric string before "W", a three-digit numeric string following "W", a numeric string following that numeric string and before "W", and a three-digit numeric string following "W", thereby obtaining "500", "200", "1500", and "040". For the second numeric string and the fourth numeric string, reader 20 then analyzes a first digit as "min." and the following two digits as "sec.". In addition, reader 20 analyzes the first numeric string as the heating power corresponding to the time of the second numeric string, and the third numeric string as the heating power corresponding to the time of the fourth numeric string. As a result, reader 20 reads the heating control information of "2 min. at 500 W" and "40 sec. at 1500 W".

The description continues with reference to FIG. 2. A user opens door 3, puts food into heating chamber 12, and closes door 3. Once reader 20 detects that the door has been opened and then closed by door switch 17, reader 20 reads heating control information as described above from an image of the inside of heating chamber 12 captured by camera 16.

Reader 20 reads two pieces of the heating control information, selects, from the two pieces of the heating control information, heating control information indicating a larger power within a range of heating power available in microwave oven 1, and transmits the selected heating control information to operation display unit 6 and heating controller 14. Operation display unit 6 displays, on liquid crystal display 7, a heating time included in the heating control information.

After checking that the suitable heating time is displayed on liquid crystal display 7, the user presses heating start button 9. Once notified that door 3 is closed from door switch 17 and that heating start button 9 is pressed from operation display unit 6, heating controller 14 controls magnetron 13 to heat the food based on the heating power and the heating time included in the heating control information transmitted from reader 20.

Next, disposing position guide unit 30 is described. Disposing position guide unit 30 detects where food is disposed based on an image captured by camera 16 and guides the food in a movement direction of the food.

When putting food into heating chamber 12, a user may place the food in an imbalanced manner, so that heating control information 23 and mark frame 29 may outside a capturing range of camera 16. In this case, disposing position guide unit 30 desirably detects where the food is disposed based on the image captured by camera 16 and determines the movement direction of the food. A description is given below assuming that if mark frame 29 is outside the capturing range of camera 16, disposing position guide unit 30 determines the movement direction of food (direction of guiding) and displays the movement direction on liquid crystal display 7.

Disposing position guide unit 30 includes empty chamber image storage unit 31, image comparator 32, guide direction determination unit 33, and empty image temporary storage unit 34. Empty chamber image storage unit 31 stores an image of the inside of a chamber in an empty state, that is, an image of the chamber where no food is disposed (empty chamber image). Image comparator 32 compares an image of the inside of the chamber captured by camera 16 with an empty chamber image stored in empty chamber image storage unit 31, thus removing an image portion of a bottom of the chamber from the in-chamber image and extracting only a food image portion. Guide direction determination unit 33 detects where that food image portion is located in an imbalanced manner in an entire in-chamber image, determines which direction the food is to be moved, and finally determines a direction of the guiding.

Empty image temporary storage unit 34 temporarily stores an image captured by camera 16 when it is detected by door switch 17 that a user has closed door 3 after the food is heated by magnetron 13, for the purpose of storing an image of empty heating chamber 12, where no food disposed, in empty chamber image storage unit 31.

A user commonly opens or closes door 3 to put or take food into or out of heating chamber 12. After putting the food into heating chamber 12 and closing door 3, the user operates heating start button 9 to heat the food. When the food has been heated, the user opens door 3.

When the user takes the food out of heating chamber 12 and closes door 3, heating chamber 12 is empty. In such a state, unless the user opens door 3 to put the next food into heating chamber 12, no food is heated through the operation of heating start button 9.

Consequently, among images captured when the door is changed from an open state to a closed state, the image of empty heating chamber 12 is highly possibly an image captured when heating start button 9 has not been operated before the door is opened again.

Every time it is detected by door switch 17 that door 3 has been closed, camera 16 captures an image of the inside of heating chamber 12. Every time camera 16 captures an image, empty image temporary storage unit 34 stores that image. When it is detected by door switch 17 that heating start button 9 has not been pressed and door 3 is then opened, empty chamber image storage unit 31 retrieves an image stored in empty image temporary storage unit 34 and stores the image as an empty chamber image.

In some cases, the user is guided by disposing position guide unit 30 to change a disposing position of food without heating the food and then closes door 3. In those cases, camera 16 desirably captures an image only when the door is opened and closed after heating of the food. Alternatively, empty image temporary storage unit 34 desirably stores an image captured by camera 16 only when the door is opened and closed after heating of the food.

Next, a comparison method by image comparator 32 is described. Image comparator 32 compares an in-chamber image captured by camera 16 with an empty chamber image stored in empty chamber image storage unit 31 to determine differences. Specifically, image comparator 32 calculates the difference between a grayscale value of each pixel constituting the in-chamber image captured by camera 16 and a grayscale value of each pixel constituting the empty chamber image stored in empty chamber image storage unit 31 for pixels at an identical position. A position of a pixel where the difference is equal to or exceeds a predetermined range is extracted. This achieves extraction of the position of a pixel having a difference between the empty chamber image and the in-chamber image. The position of the food placed is thus extracted.

Next, a determination method by guide direction determination unit 33 based on a comparison result of image comparator 32 is described with reference to FIGS. 4 to 7. Guide direction determination unit 33 performs classification based on which side of a frame of an in-chamber image contacts a position of food (food position) extracted by image comparator 32.

Guide direction determination unit 33 first determines how many sides of four sides of the frame of the in-chamber image contact the food position.

Figure 4:
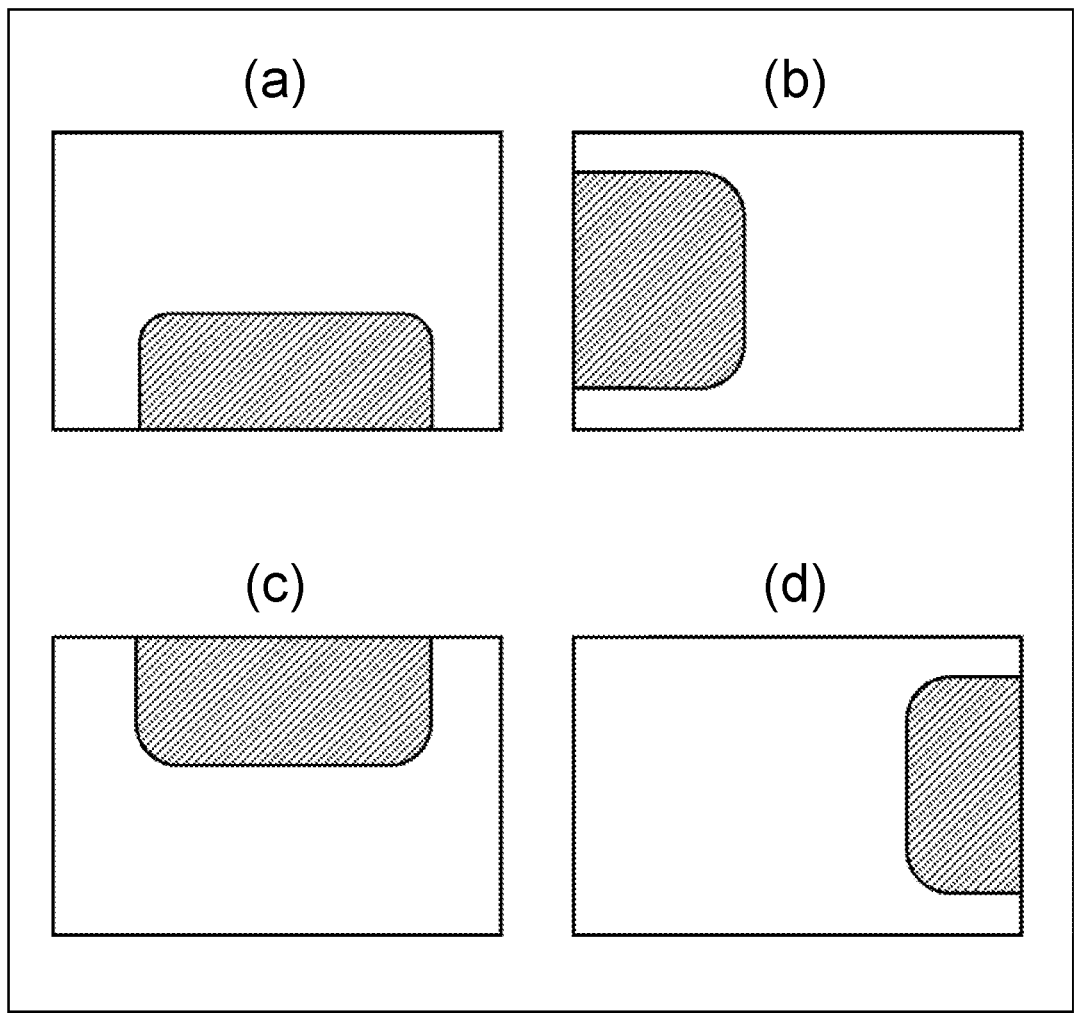
FIG. 4 is an explanatory diagram of images of comparison results by an image comparator of the heating cooker according to the first exemplary embodiment of the present invention, illustrating differential images in which a side of an object to be heated contacts the frame.

An example in which the food position contacts a side of the in-chamber image is described with reference to FIG. 4. FIG. 4 illustrates differential images obtained by extracting only a food image portion. In FIG. 4, a hatched portion indicates a food position extracted by image comparator 32.

Part (a) of FIG. 4 illustrates a case where the food position contacts a lower side of the frame of the in-chamber image. It is determined from the image that the food is placed closer to a front side (a side of door 3) in a capturing range of camera 16. In this case, guide direction determination unit 33 determines that a direction of the guiding is a direction toward rear. A message "MOVE FOOD TO REAR" is displayed on liquid crystal display 7.

Part (b) of FIG. 4 illustrates a case where the food position contacts a left side of the frame of the in-chamber image. It is determined from the image that the food is placed closer to a left side in the capturing range of camera 16 when a user faces the rear side of heating chamber 12. In this case, guide direction determination unit 33 determines that the direction of the guiding is right when the user faces the rear side of heating chamber 12. A message "MOVE FOOD TO RIGHT" is displayed on liquid crystal display 7.

Part (c) of FIG. 4 illustrates a case where the food position contacts an upper side of the frame of the in-chamber image. It is determined from the image that the food is placed closer to the rear side in the capturing range of camera 16. In this case, guide direction determination unit 33 determines that the direction of the guiding is a direction toward front. A message "MOVE FOOD TO FRONT" is displayed on liquid crystal display 7.

Part (d) of FIG. 4 illustrates a case where the food position contacts a right side of the frame of the in-chamber image. It is determined from the image that the food is placed closer to a right side in the capturing range of camera 16 when the user faces the rear side of heating chamber 12. In this case, guide direction determination unit 33 determines that the direction of the guiding is left when the user faces the rear side of heating chamber 12. A message "MOVE FOOD TO LEFT" is displayed on liquid crystal display 7.

That is, when the food position contacts one of four sides of the frame of the in-chamber image, guide direction determination unit 33 determines that a movement direction of food is a direction toward a side opposing the side that contacts the food position.

Figure 5:
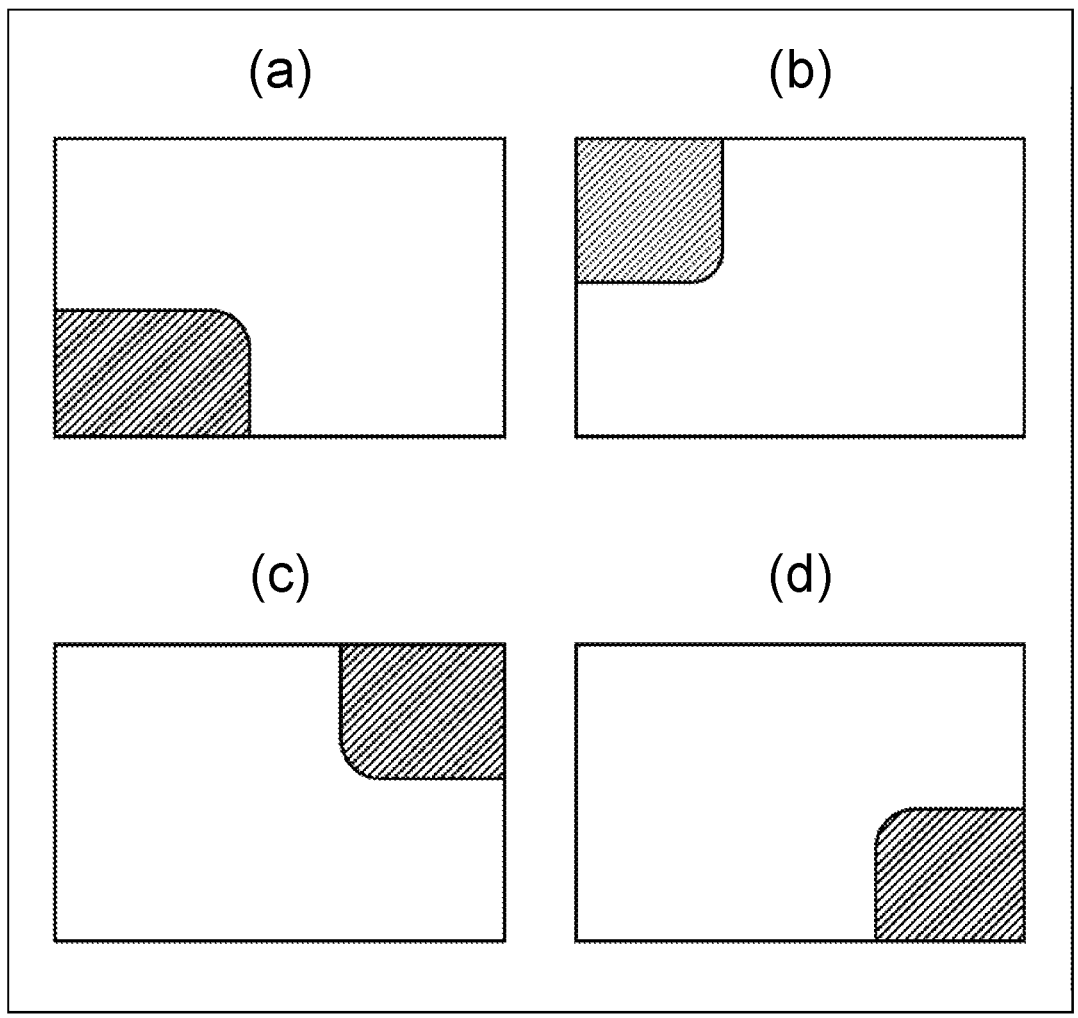
FIG. 5 is an explanatory diagram of images of comparison results by the image comparator of the heating cooker according to the first exemplary embodiment of the present invention, illustrating differential images in which two sides of an object to be heated contact the frame.

Next, an example in which the food position contacts two adjacent sides of the in-chamber image is described with reference to FIG. 5. Similarly to FIG. 4, FIG. 5 illustrates differential images obtained by extracting only a food image portion. In FIG. 5, a hatched portion indicates a food position extracted by image comparator 32.

Part (a) of FIG. 5 illustrates a case where the food position contacts two sides, that is, left and lower sides of the frame of the in-chamber image. It is determined from the image that the food is placed closer to a front left side in the capturing range of camera 16 when a user faces the rear side of heating chamber 12. In this case, guide direction determination unit 33 determines that the direction of the guiding is a direction toward a rear right side when a user faces the rear side of heating chamber 12. A message "MOVE FOOD TO REAR RIGHT" is displayed on liquid crystal display 7.

Part (b) of FIG. 5 illustrates a case where the food position contacts two sides, that is, left and upper sides of the frame of the in-chamber image. It is determined from the image that the food is placed closer to a rear left side in the capturing range of camera 16 when the user faces the rear side of heating chamber 12. In this case, guide direction determination unit 33 determines that the direction of the guiding is a direction toward a front right side when the user faces the rear side of heating chamber 12. A message "MOVE FOOD TO FRONT RIGHT" is displayed on liquid crystal display 7.

Part (c) of FIG. 5 illustrates a case where the food position contacts two sides, that is, right and upper sides of the frame of the in-chamber image. It is determined from the image that the food is placed closer to a rear right side in the capturing range of camera 16 when the user faces the rear side of heating chamber 12. In this case, guide direction determination unit 33 determines that the direction of the guiding is a direction toward a front left side when the user faces the rear side of heating chamber 12. A message "MOVE FOOD TO FRONT LEFT" is displayed on liquid crystal display 7.

Part (d) of FIG. 5 illustrates a case where the food position contacts two sides, that is, right and lower sides of the frame of the in-chamber image. It is determined from the image that the food is placed closer to a front right side in the capturing range of camera 16 when the user faces the rear side of heating chamber 12. In this case, guide direction determination unit 33 determines that the direction of the guiding is a direction toward a rear left side when the user faces the rear side of heating chamber 12. A message "MOVE FOOD TO REAR LEFT" is displayed on liquid crystal display 7.

That is, when the food position contacts two of four sides of the frame of the in-chamber image, guide direction determination unit 33 determines that the movement direction of food is a direction toward a corner opposing a corner formed by the two sides that contact the food position. Guide direction determination unit 33 can thus selects, as the movement direction of food, not only a horizontal direction and a depth direction of heating chamber 12 but also a diagonal direction such as directions toward the rear right side and the front left side. The user can thus easily understand the movement direction of food.

Figure 6:
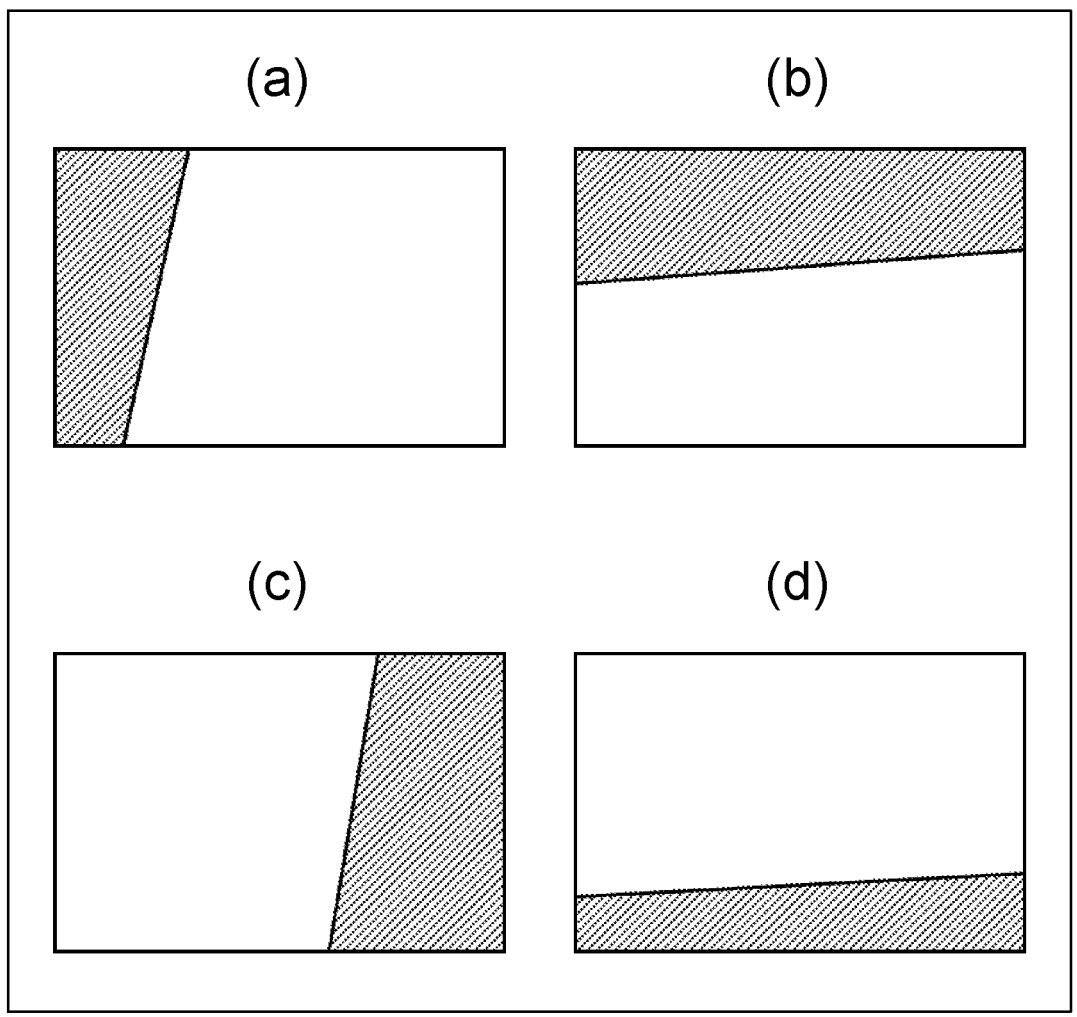
FIG. 6 is an explanatory diagram of images of comparison results by the image comparator of the heating cooker according to the first exemplary embodiment of the present invention, illustrating the images of comparison results in which three sides of an object to be heated contact the frame.

Next, an example in which the food position contacts three sides of the in-chamber image is described with reference to FIG. 6. Similarly to FIG. 4, FIG. 6 illustrates differential images obtained by extracting only a food image portion. In FIG. 6, a hatched portion indicates a food position extracted by image comparator 32.

Part (a) of FIG. 6 illustrates a case where the food position contacts three sides, that is, lower, left, and upper sides of the frame of the in-chamber image. It is determined from the image that food is placed closer to the left side in the capturing range of camera 16 when a user faces the rear side of heating chamber 12. It is also determined from the image that the food position contacts both upper and lower sides of the in-chamber image and thus the food is properly disposed in the depth direction. In such a case, guide direction determination unit 33 determines that the direction of the guiding is right. The message "MOVE FOOD TO RIGHT" is displayed on liquid crystal display 7.

Part (b) of FIG. 6 illustrates a case where the food position contacts three sides, that is, left, upper, and right sides of the frame of the in-chamber image. It is determined from the image that food is placed closer to the rear side of heating chamber 12 in the capturing range of camera 16. It is also determined from the image that the food position contacts both left and right sides of the in-chamber image and thus the food is properly disposed in the horizontal direction. In this case, guide direction determination unit 33 determines that the direction of the guiding is the direction toward the front. The message "MOVE FOOD TO FRONT" is displayed on liquid crystal display 7.

Part (c) of FIG. 6 illustrates a case where the food position contacts three sides, that is, upper, right, and lower sides of the frame of the in-chamber image. It is determined from the image that food is disposed closer to the right side in the capturing range of camera 16, when the user faces the rear side of heating chamber 12. It is also determined from the image that the food position contacts both lower and upper sides of the in-chamber image and thus the food is properly disposed in the depth direction. In such a case, guide direction determination unit 33 determines that the direction of the guiding is left. The message "MOVE FOOD TO LEFT" is displayed on liquid crystal display 7.

Part (d) of FIG. 6 illustrates a case where the food position contacts three sides, that is, right, lower, and left sides of the frame of the in-chamber image. It is determined from the image that food is placed closer to the front side in the capturing range of camera 16 when the user faces the rear side of heating chamber 12. It is also determined from the image that the food position contacts both left and right sides of the in-chamber image and thus the food is properly disposed in the horizontal direction. In such a case, guide direction determination unit 33 determines that the direction of the guiding is the direction toward the rear. The message "MOVE FOOD TO REAR" is displayed on liquid crystal display 7.

That is, when the food position contacts three of four sides of the frame of the in-chamber image, guide direction determination unit 33 determines that the movement direction of food is a direction toward a side opposing a side at a center of the three sides.

Figure 7:
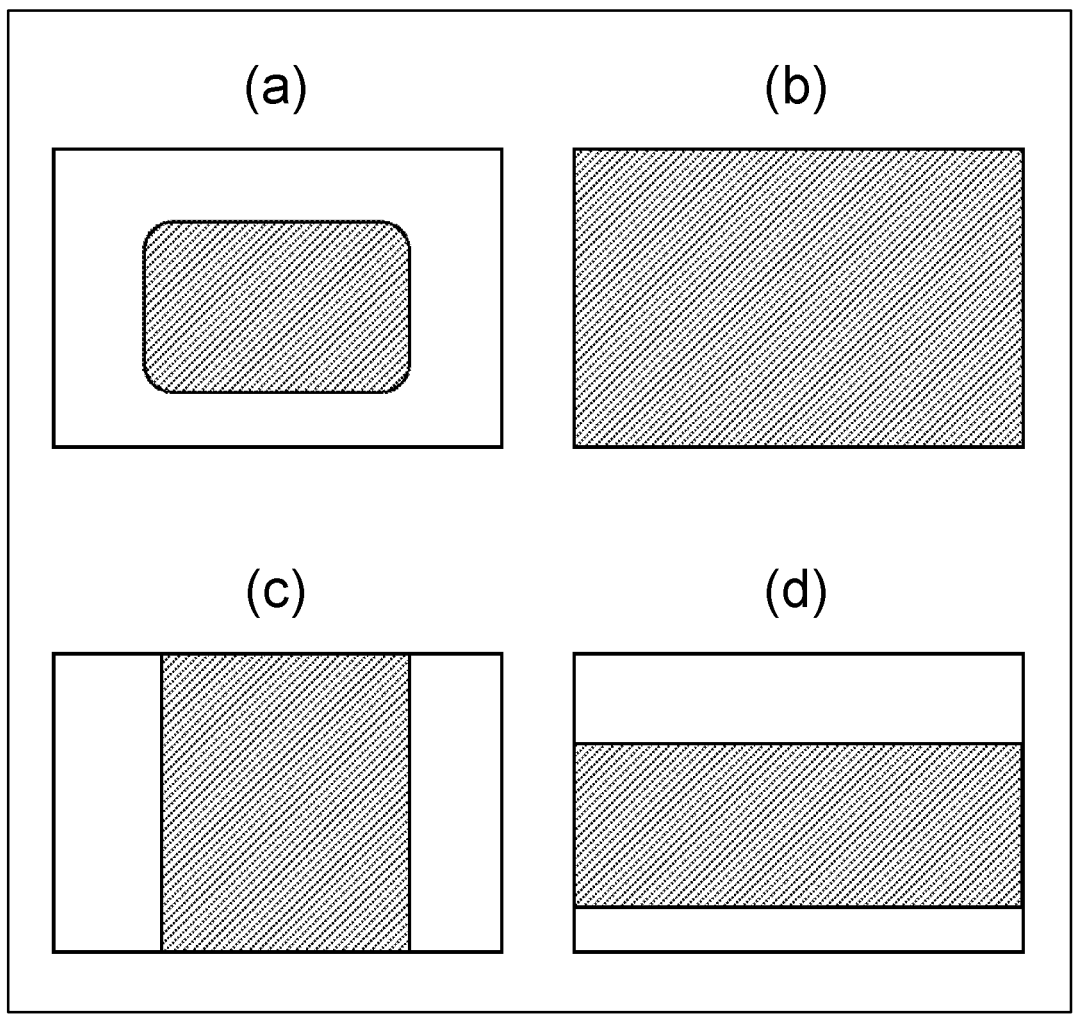
FIG. 7 is an explanatory diagram of images of comparison results by the image comparator of the heating cooker according to the first exemplary embodiment of the present invention, illustrating differential images in a case where a direction of the guiding of an object to be heated cannot be determined.

Next, an example in which it cannot be determined which direction food is to be guided is described with reference to FIG. 7. Similarly to FIG. 4, FIG. 7 illustrates differential images obtained by extracting only a food image portion. In FIG. 7, a hatched portion indicates a food position extracted by image comparator 32.

Part (a) of FIG. 7 illustrates a case where the food position does not contact any sides of the frame of the in-chamber image. It is determined from the image that food is placed at the center of the capturing range of camera 16.

Part (b) of FIG. 7 illustrates a case where the food position contacts all the four sides of the in-chamber image. It is determined from the image that food is placed properly, that is, at the center of the capturing range of camera 16.

Part (c) of FIG. 7 illustrates a case where the food position contacts two sides, that is, lower and upper sides of the in-chamber image. It is determined from the image that the food is not placed closer to the front and rear sides, as well as the left and right sides, that is, disposed at the center of the capturing range of camera 16.

Part (d) of FIG. 7 illustrates a differential image when the food position contacts two sides, that is, left and right sides of the in-chamber image. It is determined from the image that food is not disposed closer to the left and right sides, as well as the front and rear sides, that is, disposed at the center of capturing range of camera 16.

Since it is determined from the differential images illustrated in FIG. 7 that the food is placed at the center, guide direction determination unit 33 cannot determine the direction of the guiding. Guide direction determination unit 33 thus displays, for example, a message "SWITCH TO MANUAL SETTING" on liquid crystal display 7. This is because heating control information 23 and mark frame 29 may not be printed on the container of the food or the like.

When mark frame 29 is out of the capturing range of camera 16 as described above, disposing position guide unit 30 determines the movement direction of food based on which side of the frame of the in-chamber image contacts the food position extracted by image comparator 32.

Guide direction determination unit 33 first determines how many sides of four sides of the frame of the in-chamber image contact the food position. When the food position does not contact any of the four sides of the frame of the in-chamber image or when the food position contacts all the four sides, the movement direction of food is not determined and a message for prompting a user to perform setting through operation display unit 6 is displayed on liquid crystal display 7.

When the food position contacts only one of the four sides of the frame of the in-chamber image, it is determined that the movement direction of food is the direction toward a side opposing the side that contacts the food position and the determined direction is displayed on liquid crystal display 7.

When the food position contacts two of the four sides of the frame of the in-chamber image, it is determined whether the two sides are opposed to each other or adjacent to each other. If it is determined that the two sides that contact the food position are opposed to each other, the movement direction of food is not determined and the message for prompting a user to perform setting through operation display unit 6 is displayed on liquid crystal display 7. If it is determined that the two sides that contact the food are adjacent to each other, the movement direction of food is determined as the direction toward a corner opposing the corner formed by the two adjacent sides and the determined direction is displayed on liquid crystal display 7.

When the food position contacts three of the four sides of the frame of the in-chamber image, the movement direction of food is determined as the direction toward a side opposing the side at the center of the three sides and the determined direction is displayed on liquid crystal display 7.

Figure 8:
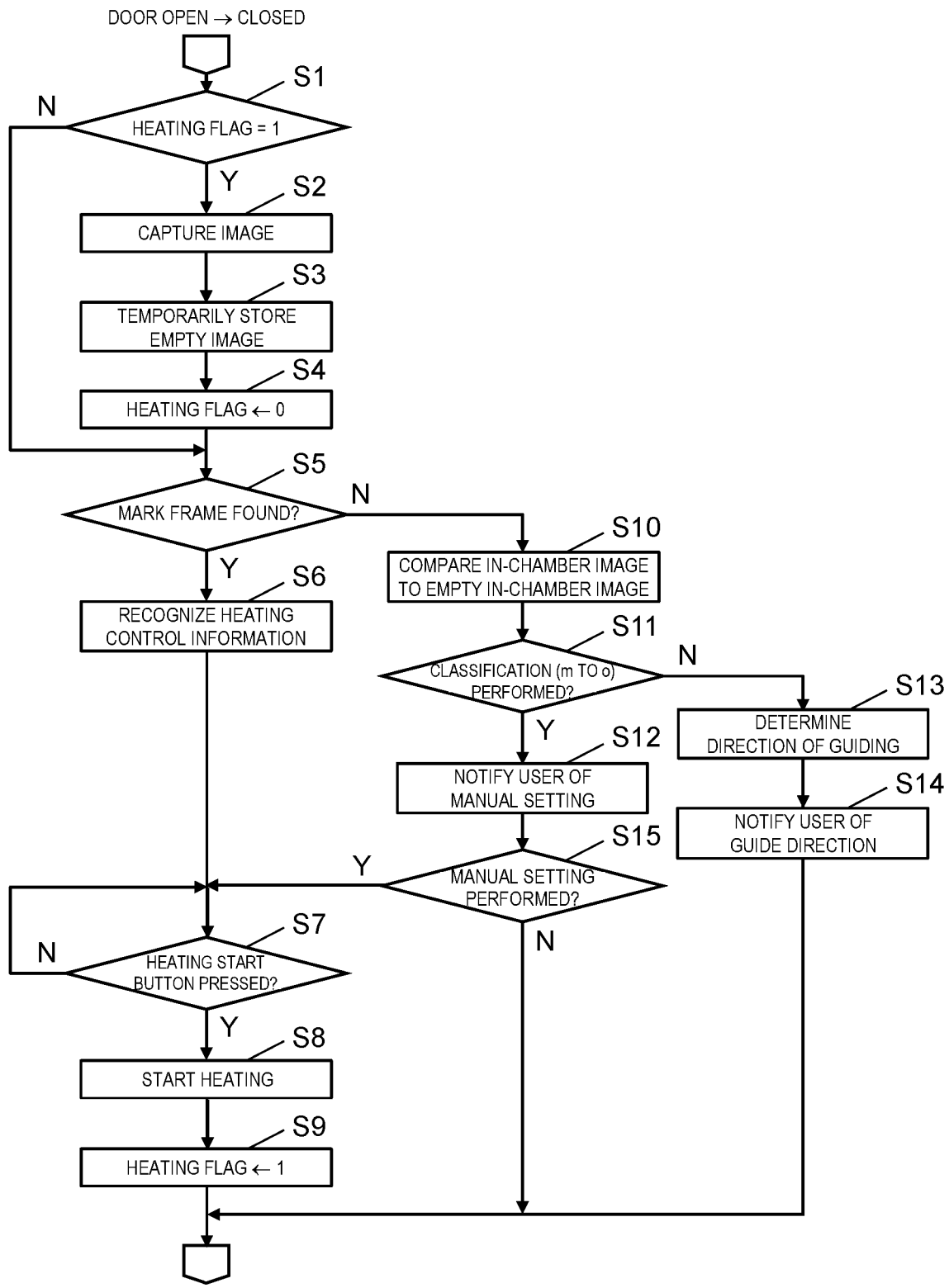
FIG. 8 is a flowchart showing an operational flow when a door of the heating cooker according to the first exemplary embodiment of the present invention is changed from an open state to a closed state.
Figure 9:
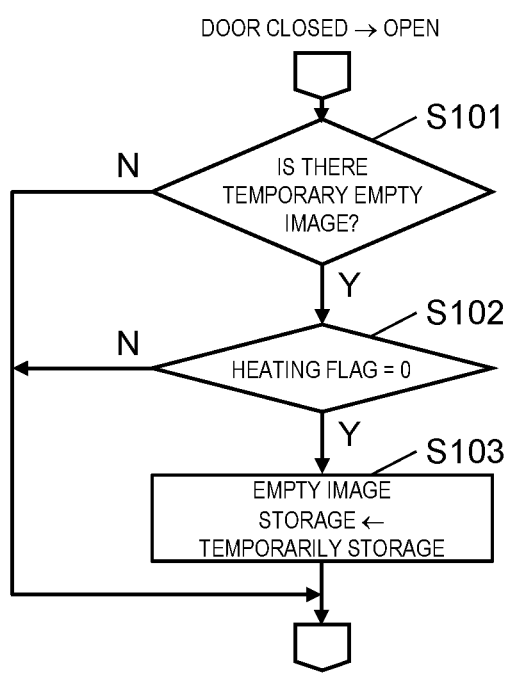
FIG. 9 is a flowchart showing an operational flow when the door of the heating cooker according to the first exemplary embodiment of the present invention is changed from the closed state to the open state.

FIGS. 8 and 9 are flowcharts showing an operational flow of heating controller 14, heating control information recognizing unit 19, and disposing position guide unit 30. FIG. 8 is a flowchart showing operations of these units when door 3 is changed from an open state to a closed state. FIG. 9 is a flowchart showing operations of these units when door 3 is changed from the closed state to the open state.

Door switch 17 first detects that door 3 is changed from the open state to the closed state. Specifically, door switch 17 detects the open state of door 3 and then the closed state of door 3.

In FIG. 8, it is checked at step S1 whether a heating flag is "1". If it is determined that the heating flag is "1", the process proceeds to step S2. On the other hand, if it is determined that the heating flag is not 1, the process proceeds to step S5. The heating flag is used for determining whether heating is performed by magnetron 13, and is a 1-bit variable that is "1" when heating is performed and is "0" when heating is not performed.

Camera 16 captures an image of the inside of heating chamber 12 at step S2. Empty image temporary storage unit 34 stores the in-chamber image captured by camera 16 at step S3. The heating flag is reset from "1" to "0" at step S4.

Reader 20 searches for mark frame 29 in the in-chamber image captured by camera 16 at step S5. If mark frame 29 is found, the process proceeds to step S6. On the other hand, mark frame 29 is not found, the process proceeds to step S10.

Reader 20 reads heating control information 23 at step S6. The process then proceeds to step S7.

Heating controller 14 detects at step S7 whether heating start button 9 is pressed. If heating start button 9 is pressed, the process proceeds to step S8. On the other hand, if heating start button 9 is not pressed, step S7 is repeated and the process waits until heating start button 9 is pressed.

At step S8, heating controller 14 heats the food by magnetron 13 based on the heating control information read by reader 20. The heating flag is set to "1" at step S9 and the process ends.

When reader 20 cannot find mark frame 29 at step S5, image comparator 32 compares, at step S10, the in-chamber image captured by camera 16 with the empty chamber image stored in empty chamber image storage unit 31 and extracts a differential image.

At step S11, guide direction determination unit 33 classifies the differential image based on sides of frames of differential images illustrated in FIGS. 4 to 7. That is, guide direction determination unit 33 determines which images of parts (a) to (d) of FIG. 7 correspond to the differential image. More specifically, guide direction determination unit 33 determines at step S11 how many sides of four sides of the frame of the in-chamber image contact the food position based on the differential image.

When the differential image corresponds to any of parts (a) to (d) of FIG. 7 at step S11, the process proceeds to step S12. On the other hand, when the differential image does not correspond to any of parts (a) to (d) of FIG. 7, the process proceeds to step S13. When the differential image corresponds to any of parts (a) to (d) of FIG. 7, guide direction determination unit 33 cannot determine a direction of the guiding.

Alternatively, in a case where the food position in the differential image does not contact any of the four sides of the frame of the in-chamber image at step S11, when the food position contacts two side that are not adjacent to each other and when the food position contacts all the four sides, the process proceeds to step S12. Otherwise, the process proceeds to step S13.

A message "SWITCH TO MANUAL SETTING" is displayed on liquid crystal display 7 at step S12. The process then proceeds to step S15.

It is determined at step S15 whether heating control information including, for example, a heating power and a heating time is manually set. If the heating control information is manually set, the process proceeds to step S7 and heating controller 14 waits for heating start button 9 being pressed. On the other hand, if the heating control information is not manually set, the process ends.

When the process proceeds to step S13 at step S11 described above, guide direction determination unit 33 determines a direction of the guiding at step S13.

That is, when the food position in the differential image contacts only one side of four sides of the frame of the in-chamber image, guide direction determination unit 33 determines a direction of the guiding as a direction toward a side opposing the side that contacts the food position.

When the food position contacts two of four sides of the frame of the in-chamber image, guide direction determination unit 33 determines a direction of the guiding as a direction toward a corner opposing a corner formed by the two sides that contact the food position.

When the food position contacts three of four sides of the frame of the in-chamber image, guide direction determination unit 33 determines a direction of the guiding as a direction toward a side opposing a side at the center of the three sides.

Guide direction determination unit 33 displays at step S14 a direction of the guiding determined at step S13 on liquid crystal display 7. Thereafter, the processing ends.

Next, an operation when door 3 is changed from the closed state to the open state is described. Door switch 17 detects that door 3 is changed from the closed state to the open state. Specifically, door switch 17 detects the closed state of door 3 and then the open state of door 3.

As shown in FIG. 9, disposing position guide unit 30 checks at step S101 whether an image is stored in empty image temporary storage unit 34. If an image is stored, the process proceeds to step S102. On the other hand, if no image is stored, the process ends.

It is checked at step S102 whether the heating flag is 0. If the heating flag is 0, that is, heating is not performed, the process proceeds to step S103. On the other hand, if the heating flag is not 0, that is, heating is performed, the process ends.

When the process proceeds to step S103, an image has been stored in empty image temporary storage unit 34 and heating has not been performed when door 3 is changed from the closed state to the open state. The image stored in empty image temporary storage unit 34 is possibly an image of empty heating chamber 12. The image stored in empty image temporary storage unit 34 is thus transmitted to empty chamber image storage unit 31 at step S103. Thereafter, the processing ends.

As described above, according to the present exemplary embodiment, heating control information recognizing unit 19 recognizes heating control information of an object to be heated from an image of the inside of heating chamber 12 captured by camera 16, and heating controller 14 controls magnetron 13 based on the heating control information. A user does not need to perform cumbersome operations. Additionally, when heating control information recognizing unit 19 is difficult to recognize heating control information, disposing position guide unit 30 prompts the user to guide the object to be heated to the capturing range of camera 16.

It is thus possible to recognize the heating control information with a simple configuration including a single camera.

While characters of the heating control information are read and recognized in the present exemplary embodiment, symbol information such as barcodes may be read and recognized instead of the characters. Alternatively, colors or shapes may be recognized.

As described above, the present invention includes a heating chamber that houses an object to be heated, a heating unit that heats the object to be heated disposed in the heating chamber, an imaging unit that captures an image of an inside of the heating chamber, and a heating control information recognizing unit that recognizes heating control information of the object to be heated from an image captured by the imaging unit. The present invention also includes a heating controller that controls the heating unit based on the heating control information recognized by the heating control information recognizing unit and a disposing position guide unit that guides a disposing position of the object to be heated to a capturing range of the imaging unit.

With this configuration, it is possible to achieve a heating cooker in which the heating control information recognizing unit recognizes the heating control information of the object to be heated from an image captured by the imaging unit and the heating controller controls the heating unit based on the heating control information. When it is difficult for the heating control information recognizing unit to perform recognition, the disposing position guide unit guides the object to be heated to the capturing range of the imaging unit. It is thus possible to recognize the heating control information and automatically set the heating control content with a simple configuration including a single camera.

The present invention may be configured that when the heating control information recognizing unit cannot find the heating control information, the disposing position guide unit guides the disposing position of the object to be heated to the capturing range of the imaging unit.

With this configuration, when the heating control information recognizing unit cannot find the heating control information, the disposing position guide unit guides the disposing position of the object to be heated to the capturing range of the imaging unit. It is thus possible to recognize the heating control information and automatically set the heating control content with a simple configuration including a single camera.

The present invention may further includes an empty chamber image storage unit that stores an image in which the object to be heated is not disposed in the heating chamber, an image comparator that compares an image captured by the imaging unit with an image stored in the empty chamber image storage unit, and a guide direction determination unit that determines a disposing position of the object to be heated and a direction of the guiding based on a comparison result of the image comparator.

With this configuration, the image comparator compares a captured image with an image in which no food is placed in the heating chamber, which is stored in the empty chamber image storage unit, and the guide direction determination unit determines the disposing position of the object to be heated and the direction of the guiding. It is thus possible to guide the object to be heated to the capturing range of the imaging unit, and to recognize the heating control information and automatically set the heating control content with a simple configuration including a single camera.

The present invention further includes a door that opens or closes the heating chamber, a door switch that detects an open state and a closed state of the door, an operation unit that operates start of heating by the heating unit, and an empty image temporary storage unit that stores an image captured by the imaging unit when the door switch detects an open state of the door and then a closed state of the door after heating by the heating unit. In addition, when the door switch detects the open state of the door and the start of heating has not been operated since the door switch detects the closed state of the door, the empty chamber image storage unit may retrieve an image stored in the empty image temporary storage unit.

With this configuration, the empty image temporary storage unit stores an image captured when the door is changed from the open state to the closed state after heating. It is impossible at that time to determine whether the image is an image of an empty chamber or an image in which an object to be heated is disposed in the chamber. If the start of heating has not been operated before the door is changed to the open state, the image stored in the empty image temporary storage unit is possibly the image captured when the chamber is empty. The image stored in the empty image temporary storage unit is thus transmitted to the empty chamber image storage unit, so that the latest image of the inside of the chamber can be stored. It is thus possible to properly compare an image captured by the imaging unit with the image of the empty chamber, to guide the object to be heated to the capturing range of the imaging unit, and to recognize the heating control information and automatically set the heating control content with a simple configuration including a single camera.

INDUSTRIAL APPLICABILITY

As described above, according to the present invention, once a user merely puts food into a heating chamber, heating control information printed on the container of the food is read and heating is properly performed based on the heating control information, so that the user does not have to perform cumbersome setting. When being connected to not only microwave ovens at stores and household microwave ovens but also to devices that read the heating control information, the present invention is applicable to all cookers such as rice cookers and induction heating (IH) cooking heaters.

REFERENCE MARKS IN THE DRAWINGS

1: microwave oven
2: housing
3: door
4: glass window
5: handle
6: operation display unit
7: liquid crystal display unit
8: time-setting button group
9: heating start button
10: cancel button
11: pause button
12: heating chamber
13: magnetron (heating unit)
14: heating controller
15: lamp
16: camera (imaging unit)
17: door switch
18: projection
19: heating control information recognizing unit
20: reader 21: label
22: product name
23: heating control information
24: price information
25: expiration date information
26: barcode
27: nutrition information
28: notice information
29: mark frame
30: disposing position guide unit
31: empty chamber image storage unit
32: image comparator
33: guide direction determination unit
34: empty image temporary storage unit

The invention claimed is:

1. A heating cooker comprising:
a heating chamber that houses an object to be heated;
a heating unit that heats the object to be heated disposed in the heating chamber;
an imaging unit that captures an image of an inside of the heating chamber;
a heating control information recognizing unit that recognizes heating control information of the object to be heated from the image captured by the imaging unit;
a heating controller that controls the heating unit based on the heating control information recognized by the heating control information recognizing unit;
a disposing position guide unit that guides a disposing position of the object to be heated to a capturing range of the imaging unit, and
an operation display unit configured to display a direction of guiding determined by the disposing position guide unit,
wherein the disposing position guide unit determines the direction of guiding of the disposing position of the object to be heated to a capturing range in the heating chamber based on the image captured by the imaging unit, and
the direction of guiding determined by the disposing position guide unit is displayed by the operation display unit.

2. The heating cooker according to claim 1, wherein when the heating control information recognizing unit does not recognize the heating control information, the disposing position guide unit guides the disposing position of the object to be heated to the capturing range of the imaging unit.

3. The heating cooker according to claim 1, further comprising:
an empty chamber image storage unit that stores an image in which the object to be heated is not disposed in the heating chamber;
an image comparator that compares the image captured by the imaging unit with the image stored in the empty chamber image storage unit; and
a guide direction determination unit that determines the disposing position of the object to be heated and a direction of the guiding based on a comparison result of the image comparator.

4. The heating cooker according to claim 3, further comprising:
a door that opens and closes the heating chamber;
a door switch that detects an open state and a closed state of the door;
an operation unit that operates start of heating by the heating unit; and
an empty image temporary storage unit that stores the image captured by the imaging unit when the door switch detects the open state of the door and then the closed state of the door after heating by the heating unit, wherein
when the door switch detects the open state of the door and the start of heating has not been operated since the door switch detects the closed state of the door, the empty chamber image storage unit retrieves the image stored in the empty image temporary storage unit.

5. A heating cooker comprising:
a heating chamber that houses an object to be heated;
a heating unit that heats the object to be heated disposed in the heating chamber;
an imaging unit that captures an image of an inside of the heating chamber;
a heating control information recognizing unit that recognizes heating control information of the object to be heated from the image captured by the imaging unit;
a heating controller that controls the heating unit based on the heating control information recognized by the heating control information recognizing unit;
a disposing position guide unit that guides a disposing position of the object to be heated to a capturing range of the imaging unit;
an empty chamber image storage unit that stores an image in which the object to be heated is not disposed in the heating chamber;
an image comparator that compares the image captured by the imaging unit with the image stored in the empty chamber image storage unit; and
a guide direction determination unit that determines the disposing position of the object to be heated and a direction of the guiding based on a comparison result of the image comparator.

6. The heating cooker according to claim 5, further comprising:
a door that opens and closes the heating chamber;
a door switch that detects an open state and a closed state of the door;
an operation unit that operates start of heating by the heating unit; and
an empty image temporary storage unit that stores the image captured by the imaging unit when the door switch detects the open state of the door and then the closed state of the door after heating by the heating unit, wherein
when the door switch detects the open state of the door and the start of heating has not been operated since the door switch detects the closed state of the door, the empty chamber image storage unit retrieves the image stored in the empty image temporary storage unit.

* * * * *